Patented Jan. 5, 1937

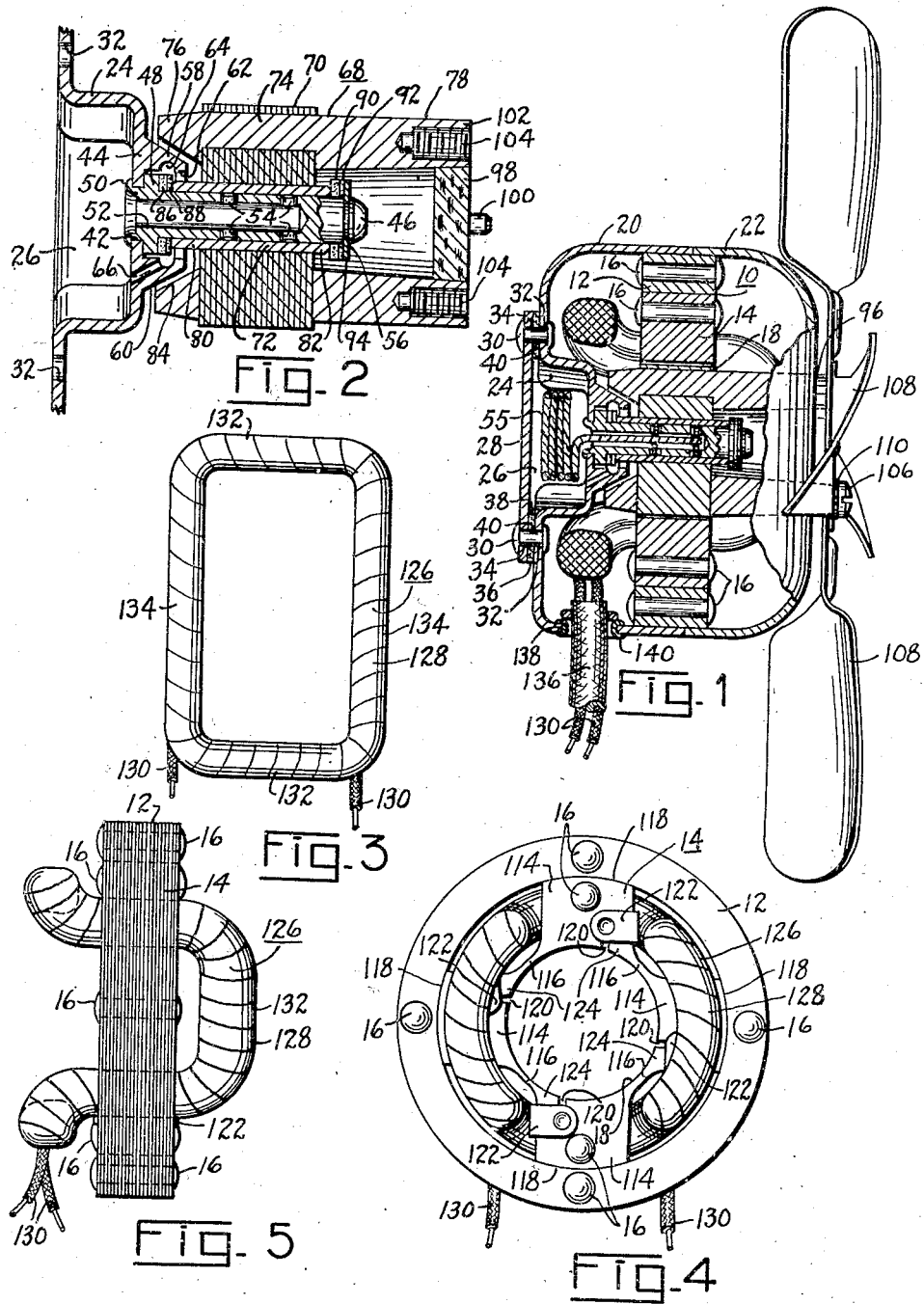

2,067,155

UNITED STATES PATENT OFFICE 2,067,155

MOTOR

Irving M. Levy and Barrett Kemp, Dayton, Ohio, assignors to General Motors Corporation, Detroit, Mich., a corporation of Delaware Application May 31, 1934, Serial No. 728,274

3 Claims. (Cl. 172—36)

This invention relates to dynamo electric machines, and more particularly to electric motors.

An object of this invention is to provide a motor structure that has good speed, torque and efficiency characteristics, and that is easy to manufacture.

Another object of this invention is to provide a motor structure having a single bearing rotatably supporting the rotor on a stationary stub shaft, and having means for securing a driven member to the rotor to be driven thereby.

Another object of this invention is to provide a motor having a stator that has good magnetic characteristics and effects uniform flux distribution to the rotor.

Another object of this invention is to provide a motor having a stator structure utilizing integral magnetic bridges between the pole tips, and that permits the use of a prewound field winding.

Further objects and advantages of the present invention will be apparent from the following description, reference being had to the accompanying drawing wherein a preferred embodiment of one form of the present invention is clearly shown.

In the drawing:

Fig. 1 is a sectional view of a motor assembly embodying a preferred form of the present invention.

Fig. 2 is an enlarged sectional view of the rotor, showing more clearly the details of the structure of said rotor and the means for supporting the rotor.

Fig. 3 is an elevation of a preferred form of coil for energizing the motor field.

Figs. 4 and 5 are elevation and side views respectively, of a preferred form of stator for the motor.

With particular reference to Figs. 1 and 2, a stator 10 has an outer ring-like member 12 and an inner member 14, which members are each made up of stacks of laminations of magnetic material secured together by rivets or other suitable fastening means 16. The members 12 and 14 are preferably pressed together, and the inner member 14 has an opening 18 therein that is preferably centrally located in the member.

Substantially cup-shaped housing members 20 and 22 preferably fit over the outer surface of the ring-like member 10 and preferably abut each other to provide an enclosure for the structure. The housing member 20 has an indented or recessed portion 24 that is preferably centrally located, and which provides a lubricant reservoir 26. A cover plate 28 covers the lubricant reservoir 26 and is secured to the housing member 20 by rivets or other suitable fastening means such as 30 which pass through holes such as 32 in the housing member and holes such as 34 in the cover. A gasket 36 having a central opening 38 therein, and holes such as 40 through which the rivets or fastening means 30 pass, is preferably interposed between the cover plate 28 and the housing.

An opening 42 is provided in a wall 44 of the lubricant supply chamber, preferably at the center thereof. A stub shaft 46 has a portion extending through the opening 42 and a shoulder portion 48 that rests against one side of the wall 44. A rolled or spun edge portion 50 on the end of the shaft, and on the other side of the wall 44 from the shoulder portion 48, secures the shaft in position so that it projects away from the wall and the lubricant supply chamber. The shaft 46 has an axially extending passage 52 therein that opens into and communicates with the lubricant supply chamber 26. Cross passages 54 in the shaft 46 provide communication between the passage 52 and the outer surface of the shaft. Packing or a wick such as 55 is preferably inserted in the lubricant chamber and passages to absorb the lubricant, and to convey the lubricant to the shaft. The shaft 46 also preferably has a groove 56 near the projecting end thereof.

A circular projecting portion 58 is provided on the opposite side of the wall 44 from the lubricant chamber 26. This projecting portion 58 preferably has a diverging outer surface 60, and an inner surface 62 that is spaced from and substantially parallel to the shaft, and surrounds a portion of the shaft. A groove 64 is provided in the inner surface of the projecting portion 58, and a passage 66 in the wall 44 and the projecting portion 58 extends from the groove 64 to the lubricant supply chamber 26 to provide a return passage for lubricant. A motor rotor 68, preferably the squirrel cage type, has a laminated core 70 of magnetic material that is preferably pressed onto a journal bearing 72. The rotor 68 also has conductor bars such as 74 and end rings 76 and 78, which conductor bars and end rings are preferably integrally die cast. The bearing 72 preferably has projecting portions 80 and 82 that extend beyond the ends of the core 70. The bearing 72 fits onto the shaft 46, and is rotatable thereon. The projecting portion 80 of the bearing preferably extends into the projecting portion 58 and is diametrically spaced somewhat therefrom. The inner surface 84 of the end ring 76 is preferably converging, and surrounds a portion of the projecting portion 58.

Washers such as 86 and 88 are preferably interposed between the shoulder portion 48 on the shaft, and the end of the bearing 72 to locate the bearing axially on the shaft and to provide a partial lubricant seal at the end of the bearing. Washers such as 90 and 92 surround the shaft at the other end of the bearing and take up axial movement or end play of the bearing on the shaft, and provide a partial lubricant seal at that end of the shaft. The washers 86 and 90 are preferably made of felt or of similar absorbent material, while the washers 88 and 92 are preferably made of fiber. A spring clip washer 94 or other suitable fastening means fits into the groove 56 in the shaft to lock the rotor in place.

The end ring 78 preferably extends beyond the projecting end of the shaft and through an opening 96 in the housing member 22. A plug 98 of cork or other suitable material is inserted in the opening at the end of the end ring 78 to close the opening defined by that end ring and prevent the leakage of lubricant. Studs such as 100 are preferably formed integrally with end ring 78 and project from the end surface 102 thereof. The end ring 78 also preferably has threaded holes such as 104 therein into which screws such as 106 are threaded to secure a driven member such as a fan 108 to the rotor to be driven thereby. The screws 106 are preferably provided with lock washers such as 110 to prevent loosening of the screws. The studs 100 pass through suitable openings, not shown, in the driven member to locate the member.

As best shown in Figs. 4 and 5, the inner member 14 has radially extending pole pieces or portions 114, which pole pieces are connected together at the inner end by integral bridging portions 116. This inner member 14 is preferably pressed into the outer ring-like member 12 so that a low reluctance butt joint is provided between the members at the outer ends of the pole pieces, such as at 118. The pole pieces 114 have slots 120 therein, which slots open into the central circular opening 18 that is defined by the pole pieces and bridging portion. Shading coils 122 enclose a portion 124 of each of the pole pieces, and are mounted on the pole pieces so that one side of each of the shading coils passes through one of the slots 120.

Coil 126 that is preferably prewound substantially as shown in Fig. 3, is preferably covered with wound insulating tape 128 and has insulated leads 130 for making connection thereto. This coil preferably has two short sides 132 and two longer sides 134. The coil is mounted on the inner member 14 before that inner member is inserted into the outer member 12, and is so mounted that the short sides 132 cross alternate pole pieces on the same side thereof; and the longer sides 134 are bent around the intermediate pole pieces so that the coil thus substantially encloses three sides of each of the pole pieces. By mounting the single coil in this manner, adjacent pole pieces have different magnetic polarity when the stator is energized. As indicated in Fig. 1, the leads 130 preferably are enclosed in an outer layer of insulating material 136 and passed through an opening 138 in the housing member 20, which opening is preferably provided with a grommet 140 or other similar means for protecting the leads from sharp edges and corners.

It will be noted from the foregoing disclosure that the structure shown and described provides a motor that is easy to manufacture and that has good speed, torque and efficiency characteristics. It is believed to be quite apparent that the manufacture of the structure is comparatively easy, because the coil 126 is prewound and easily put on the inner stator member 14, before that inner member is pressed into the outer ring 12. The single bearing eliminates the problem of bearing alignment, and provides a bearing having low friction loss. The extended end ring 78 provides a substantial mounting for the driven member and eliminates the necessity of additional parts or complicated structure for securing the driven member to the rotor. The lubricant passages permit a circulation of the lubricant from the lubricant supply chamber through the bearing, and the extended end ring and plug 98 enclose the projecting end of the shaft to prevent leakage of lubricant. The efficiency of the motor is improved by the low reluctance joints in the stator; and the speed and torque characteristics, as well as the efficiency, are improved by the integral magnetic bridge portions 116 which effect a more uniform and effective flux distribution to the rotor and decrease fringing or tufting losses.

From the foregoing description of the structure and mode of operation of this motor, it is apparent that in one aspect of the present invention, the motor comprises chiefly a stator 10, means 126 for energizing the stator 10, a housing comprising members 20 and 22 secured to the stator and having an opening 96 therein, a stationary shaft 46, a squirrel cage rotor 68 rotatably mounted on the shaft 46 and having a die cast end ring 78 extending beyond the end of the shaft 46 and through the said opening 96 in the housing, said end ring 78 providing a mounting for a driven member 108.

Among the advantages of this motor structure are the following:

(1) A durable, long lifed motor is provided which operates efficiently and all of the parts are easily manufactured and assembled.

(2) The extended end ring not only provides a convenient, substantial and cheap mounting for a driven member, but also acts as an effective oil seal when plugged to prevent leakage of lubricant.

(3) The motor is continuously lubricated from a well in the housing which holds a quantity of lubricant sufficient for long operation.

While the form of embodiment of the present invention as herein disclosed, constitutes a preferred form, it is to be understood that other forms might be adopted, all coming within the scope of the claims which follow.

What is claimed is as follows:

1. A motor comprising, in combination, a stator including an outer laminated portion comprising adjacent continuous rings of magnetic material and an inner laminated portion of magnetic material having an opening therein and outwardly projecting pole portions, said inner portion being pressed into the outer laminated portion so that butt joints are provided between the outer laminated portion and the ends of all of the pole portions, a single prewound coil mounted on the pole portions within the outer laminated portion and encircling three sides of each of the pole portions so that adjacent pole portions are of opposite magnetic polarity, shading coils encircling a part of each of the pole portions, a substantially cup-shaped housing member fitted onto the outer laminated portion of the stator and covering one side of the stator, a stub shaft supported at one end by said housing member and extending through said opening in the inner portion, a rotor rotatably mounted on the shaft within said opening and having conductors, a second substantially cup-shaped housing member fitted onto the outer ring and covering the other side of the stator, said second housing member having an opening therein, and said rotor having an end ring for short circuiting the rotor conductors, which end ring projects through the opening in the second housing member.

2. A motor comprising, in combination, a stator having poles, said poles being spaced apart and having arcuate end surfaces, a housing providing a lubricant supply chamber having a supply of lubricant therein, a stub shaft supported at one end by the housing and having lubricant conveying openings therein communicating with the lubricant supply chamber, a rotor rotatably mounted on the shaft and having die cast end rings, one of said end rings projecting beyond the end of the shaft, and a plug closing the opening defined by said one end ring to prevent the escape of lubricant said one end ring also providing a mounting for a driven member.

3. A motor comprising, in combination, a stator, means for energizing the stator, a housing secured to the stator and having an opening therein, a stationary shaft, a squirrel cage rotor rotatably mounted on the shaft and having a die cast end ring extending beyond the end of the shaft and through the said opening in the housing said end ring providing a mounting for a driven member.

IRVING M. LEVY.
BARRETT KEMP.